United States Patent [19]

Kato et al.

[11] Patent Number: 4,539,609
[45] Date of Patent: Sep. 3, 1985

[54] CASSETTE TAPE RECORDER

[75] Inventors: Toshikazu Kato; Akira Osanai, both of Tokyo, Japan

[73] Assignee: Olympus Optical Co., Ltd., Tokyo, Japan

[21] Appl. No.: 402,827

[22] Filed: Jul. 28, 1982

[30] Foreign Application Priority Data

Aug. 12, 1981 [JP] Japan .................. 56-126361

[51] Int. Cl.³ ............... G11B 15/32; G11B 15/24; G11B 5/008; G03B 1/04
[52] U.S. Cl. ..................... 360/93; 242/199; 360/96.5
[58] Field of Search ............ 360/93, 96.5, 96.6, 360/105, 96.1, 69, 137, 132; 242/198, 199, 200

[56] References Cited

U.S. PATENT DOCUMENTS 4,342,058  7/1982  Osanai .................. 242/199
4,344,096  8/1982  Tanaka .................. 360/96.5
4,426,554  1/1984  Jacobson ................ 360/93

FOREIGN PATENT DOCUMENTS 51-32613  3/1976  Japan .

*Primary Examiner*—Robert M. Kilgore
*Attorney, Agent, or Firm*—Frishauf, Holtz, Goodman & Woodward

[57] ABSTRACT

In a cassette tape recorder, a base is of a rectangular shape having a transverse length substantially equal to the longitudinal length of a cassette to be inserted. A pair of side walls are attached to opposite longitudinal side edges of the base to face each other, a capstan is located at the transverse center of the base, and a flywheel has a diameter substantially equal to the transverse length of the base. A head lever and a pinch roller lever are elongate and are arranged on the base along the transverse direction thereof and near the capstan. A cassette holder is located between the side walls, on the capstan side of the head lever, so that a substantial part of the holder overlies the flywheel. A solenoid device is mounted on the base on the opposite side of the head lever to the capstan, so that a plunger of the solenoid device may move along the longitudinal direction of the base. A motor is arranged on the base, side by side with the solenoid device, and a shifting device is attached to one of the side walls along the longitudinal direction of the base to control movement of the cassette holder.

6 Claims, 3 Drawing Figures

CASSETTE TAPE RECORDER

BACKGROUND OF THE INVENTION

This invention relates to cassette tape recorders, more specifically to cassette tape recorders requiring miniaturization, such as portable cassette tape recorders, car stereos, etc.

Portable cassette tape recorders and car stereos are generally expected to be of small size due to their intended use. Miniaturization of these cassette tape recorders has recently been expedited. In consideration of the circumstances of the portable cassette tape recorders and car stereos used presently, it is desired that a capstan drive used in these instruments be stabilized for improved resistance against vibration, by using a large-sized flywheel. In order to achieve the miniaturization of a cassette tape recorder even with use of the large-sized flywheel, the flywheel and other components of the cassette tape recorder need be arranged efficiently without leaving any idle space.

SUMMARY OF THE INVENTION

In consideration of the above-mentioned circumstances, the present invention provides a cassette tape recorder capable of additional miniaturization through efficient arrangement of components without leaving any idle space.

According to one aspect of the invention, there is provided a cassette tape recorder which comprises a base, a pair of side walls attached to the base, a capstan rotatably mounted on the base, a flywheel coaxially attached to the capstan to rotate together therewith, supporting means bearing a magnetic head and a pinch roller and arranged on the base to be movable between an operating position and a non-operating position, a cassette holder containing a cassette therein and movable between a first position to allow the cassette to be inserted thereinto and removed therefrom and a second position for playback operation, a solenoid device having a plunger coupled with the supporting means and controlling the movement of the supporting means, a motor for driving the capstan and the flywheel to rotate, and a shifting device for controlling the movement of the cassette holder. The base is in the shape of a rectangle having a transverse length substantially equal to the longitudinal length of the cassette, the pair of side walls are attached to opposite side edges of the base, extending along the longitudinal direction of the base to face each other, the capstan is located substantially in the center of the base, the flywheel has a diameter substantially equal to the transverse length of the base, the supporting means is elongate and is arranged on the base along the transverse direction thereof, the cassette holder is located between a pair of guide plates, on the capstan side of the supporting means of the base and near the capstan, the solenoid device is mounted on the base on the opposite side of the supporting means to the capstan and near the supporting means, so that the plunger may move along the longitudinal direction of the base, the motor is arranged on the base, side by side with the solenoid device along the transverse direction of the base, and the shifting device is attached to one of the side walls and extends along the longitudinal direction of the base. According to the cassette tape recorder of the invention, the transverse length or width of the base is set to a length substantially equal to the longitudinal length of the cassette, that is, the minimum possible length. The flywheel has a diameter substantially equal to the transverse length of the base so that the flywheel may be of the largest possible size to be covered by the base. The space above the flywheel is substantially filled up with the supporting means, the cassette holder, the solenoid device, and the motor. The supporting means is arranged along the transverse direction of the base, and the plunger of the solenoid device moves along the longitudinal direction of the base. Accordingly, the movements of the supporting means and the plunger require only a narrow space. Thus, the cassette tape recorder can be minimized in size through the efficient arrangement of the components without leaving any idle space.

BRIEF DESCRIPTION OF THE DRAWINGS

FIGS. 1 to 3 show a cassette tape recorder according to one embodiment of this invention, in which:

FIG. 1 is a perspective view of the present cassette tape recorder;

FIG. 2 is an enlarged plan view of the cassette tape recorder; and

FIG. 3 is an enlarged right side view of the cassette tape recorder.

DETAILED DESCRIPTION OF THE PREFERRED EMBODIMENT

Figure 1:
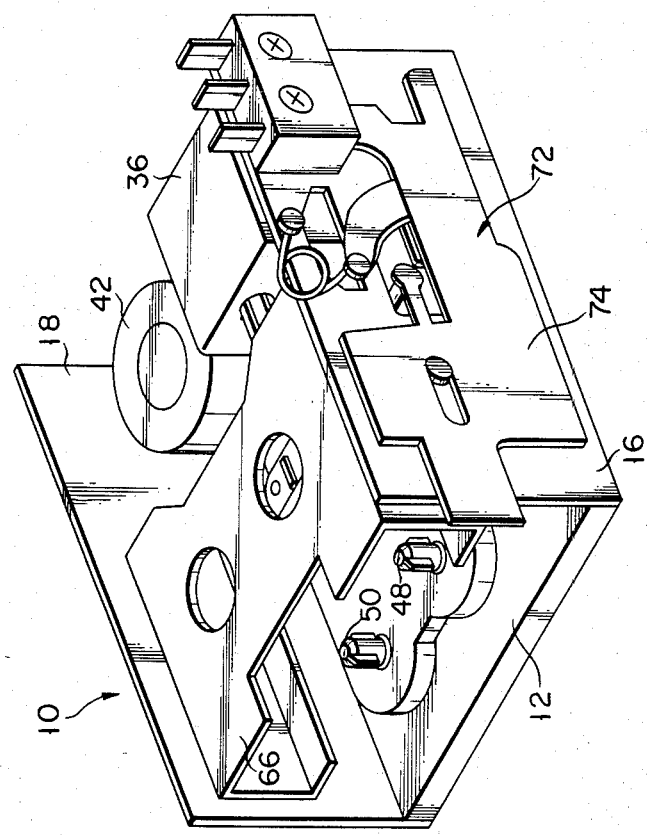
Figure 2:
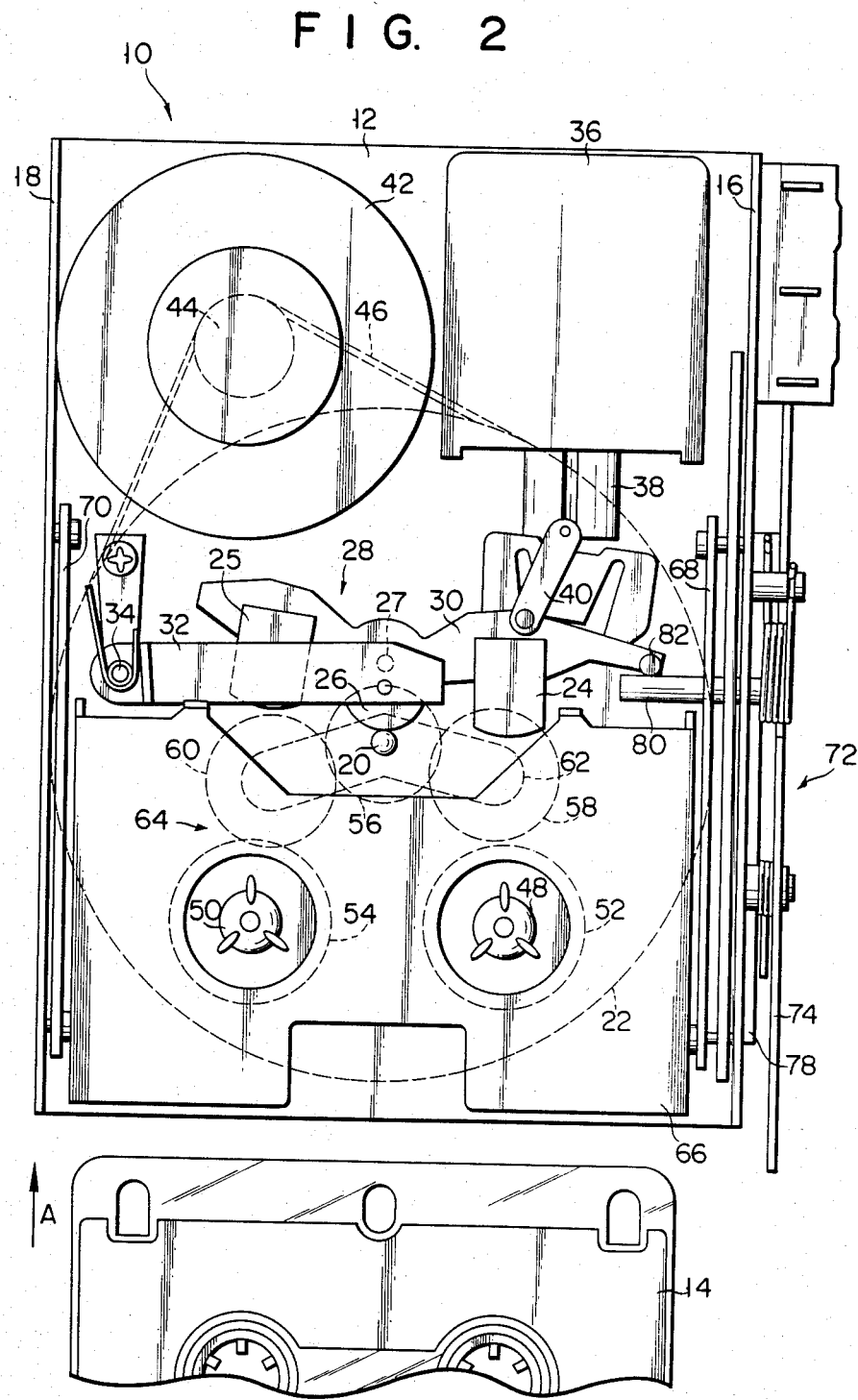
Figure 3:
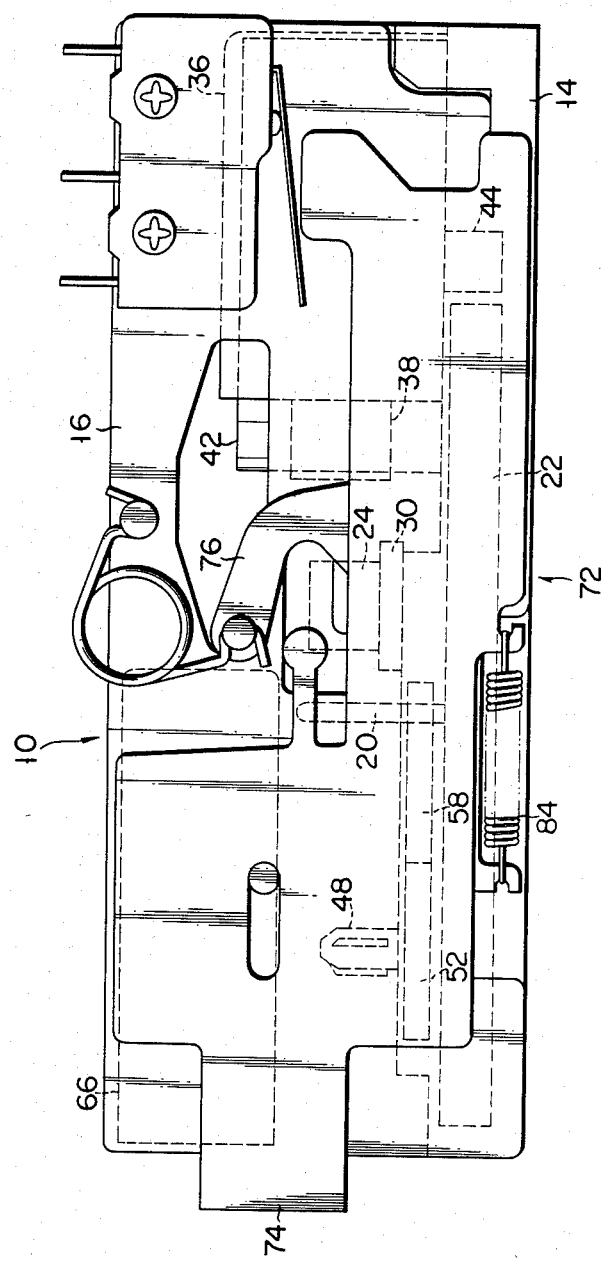

As shown in FIGS. 1 to 3, an auto-reverse-type cassette tape recorder 10 has a base 12, which is in the shape of a rectangle having a transverse length substantially equal to the longitudinal length of a micro cassette 14. Also, the tape recorder 10 has a pair of side walls 16 and 18 attached to opposite side edges of the base 12, extending along the longitudinal direction of the base 12 so as to face each other. A capstan 20 is rotatably disposed at the central portion of the base 12, vertically passing through the base 12. A flywheel 22 is coaxially attached to the lower end of the capstan 20. Located on the back side of the base 12, the flywheel 22 rotates together with the capstan 20. The diameter of the flywheel 22 is substantially equal to the transverse length of the base 12. Since, the capstan 20 as the center of the flywheel 22 is located at the central portion of the base 12, the flywheel 22 is held within the base 12 with its outer periphery kept from projecting from the base 12. The flywheel 22 has the largest possible size that can be covered by the area of the base 12.

As seen from FIG. 2, moreover, the tape recorder 10 is provided with supporting means 28 bearing a pair of magnetic heads 24 and 25 and a pinch roller 26. The supporting means 28 includes a head lever 30 bearing the magnetic heads 24 and 25 and a pinch roller lever 32 bearing the pinch roller 26. The head lever 30 is in the form of an elongate bar extending along the transverse direction of the base 12. The longitudinal central portion of the head lever 30 is supported by a rocking pin 27 extending from the transverse center of the base 12, so that the head lever 30 is rockably mounted on that portion of the base 12 which is located near the capstan 20 as in FIG. 2. The magnetic heads 24 and 25 are attached to opposite end portions of the head lever 30 at distances from the rocking pin 27. Like the head lever 30, the pinch roller lever 32 is in the form of an elongate bar extending along the transverse direction of the base 12. The pinch roller lever 32 is rockably mounted on the base 12 with its one end portion supported by a pin 34 erected on that portion of the base 12 which adjoins the side wall 18. The pinch roller 26 is rotatably supported by the other end portion of the pinch roller lever 32. The pinch roller lever 32 rocks in concert with the head lever 30. The supporting means 28 is arranged on the base 12 and above the flywheel 22. In FIG. 2, the head lever 30 and the pinch roller lever 32 are located in their respective operating positions. In these operating positions, the pinch roller 26 and the magnetic head 24 are in contact with the capstan 20 and a magnetic tape (not shown), respectively. The head lever 30 has another operating position where the magnetic head 25 is in contact with the magnetic tape.

The cassette tape recorder 10 is further provided with a solenoid device 36 for controlling the movement of the supporting means 28. The solenoid device 36 is mounted on the base 12 on the opposite side of the supporting means 28 to the capstan 20 and near the side wall 16. The solenoid device 36 includes a plunger 38 capable of reciprocating along the longitudinal direction of the base 12. The plunger 38 is coupled with the end portion of the head lever 30 on the side of the side wall 16 by means of a coupling member 40. When the solenoid device 36 is energized, the plunger 38 moves upward in FIG. 2 to rock the head lever 30 around the rocking pin 27, thereby switching the magnetic heads 24 and 25. The shifting of the head lever 30 and the pinch roller lever 32 to their respective non-operating positions (not shown) is achieved by a shifting device as mentioned later. In the non-operating positions, the pinch roller 26 and the heads 24 and 25 are fully separated from the capstan 20 and the magnetic tape, respectively.

The cassette tape recorder 10 is further provided with a motor 42 fixed on the base 12. The motor 42 is located on the opposite side of the supporting means 28 to the capstan 20 and near the side wall 18. Namely, the motor 42 is placed side by side with the solenoid device 36 along the transverse direction of the base 12. The motor 42 has a driving pulley 44 which passes through the base 12 to extend to the back side thereof. A belt 46 is passed around the driving pulley 44 and the flywheel 22, and the flywheel 22 and the capstan 20 are rotated by the motor 42 through the belt 46. The motor 42 and the solenoid device 36, which are located on the base 12, are also partially located above the flywheel 22.

On the capstan 20 side of the supporting means 28, as shown in FIG. 2, a pair of reel shafts 48 and 50 are rotatably arranged on the base 12 along the transverse direction thereof. The reel shafts 48 and 50 are coupled with reel gears 52 and 54 on the back side of the base 12 to rotate together therewith. On the back side of the base 12, moreover, a driving gear 56 is coaxially fixed to the flywheel 22 to rotate together therewith. Idler gears 58 and 60 are disposed on both sides of the driving gear 56, respectively, and are engaged with the driving gear 56. The idler gears 58 and 60 are rotatably supported by a supporting arm 62 which is supported by the capstan 20 so as to be rockable around the same. Further, the idler gears 58 and 60 can mesh with the reel gears 52 and 54, respectively. If the flywheel 22 and the capstan 20 are rotated clockwise, for example, the supporting arm 62 rocks clockwise, thereby causing the idler gear 58 to mesh with the reel gear 52. As a result, the reel shaft 48 is rotated by the driving gear 56 through the medium of the reel gear 52 and the idler gear 58. If the flywheel 22 is rotated counterclockwise, on the other hand, the idler gear 60 is caused to mesh with the reel gear 54, thereby rotating the reel shaft 50. Thus, the reel gears 52 and 54, the driving gear 56, the idler gears 58 and 60, and the supporting arm 62 constitute reel shaft driving means 64 for driving the reel shafts 48 and 50. The reel shaft driving means 64 and the reel shafts 48 and 50 are all located above the flywheel 22.

The tape recorder 10 is further provided with a cassette holder 66 capable of housing the cassette 14. The cassette holder 66 is substantially in the form of a rectangular prism corresponding to the cassette 14, that is, having a longitudinal length substantially equal to the longitudinal length of the cassette 14. The cassete holder 66 is located on the capstan 20 side of the supporting means 28, near the capstan 20 and is interposed between the side walls 16 and 18 above the base 12. The longitudinal direction of the cassette holder 66 is parallel to the transverse direction of the base 12. The cassette holder 66 is supported by a pair of supporting levers 68 and 70 rockably attached to the side walls 16 and 18, respectively, so as to be movable between a first position to allow the cassette 14 to be inserted and removed and a second position for playback operation. In FIG. 3, the cassette holder 66 is located in the first position. If the cassette 14 is inserted into the cassette holder 66 in the direction indicated by an arrow A (see FIG. 2), the cassette holder 66, along with the cassette 14, is lowered substantially vertically to reach the second position (not shown). When the cassette holder 66 reaches the second position, the head lever 30 and the pinch roller lever 32 are shifted to their operating positions by the solenoid device 36, so that the magnetic head 24 and the pinch roller 26 are brought into contact with the magnetic tape (not shown) and the capstan 20, respectively. As seen from FIG. 2, the greater part of the cassette holder 66 is located above the flywheel 22.

The cassette tape recorder 10 is further provided with a shifting device 72 attached to the side wall 16 for controlling the shifting of the cassette holder 66. The shifting device 72 includes an ejecting plate 74 arranged outside and parallel to the side wall 16 at a narrow distance therefrom, a coupling plate 76 attached to the side wall 16 between the side wall 16 and the ejecting plate 74, and a lock plate 78 sandwiched between the ejecting plate 74 and the side wall 16 for locking the cassette holder 66 to its first or second position. These components of the shifting device 72 are attached to the side wall 16 along the longitudinal direction of the base 12. The ejecting plate 74 has a push pin 80 protruding therefrom to pass through the side wall 16. The push pin 80 is so arranged as to be capable of engaging a pin 82 which protrudes from the end portion of the head lever 30 on the side of the side wall 16. The ejecting plate 74 is attached to the side wall 16 so as to movable along the longitudinal direction of the base 12. If the ejecting plate 74 is moved to the right of FIG. 3, the cassette holder 66 in the second position is transferred to the first position by the ejecting plate 74. At this time, the push pin 80 of the ejecting plate 74 pushes the pin 82 of the head lever 30 to rock the head lever 30 and the pinch roller lever 32 to their respective non-operating positions. Thereafter, the ejecting plate 74 is moved to the left of FIG. 3 by the urging force of a tension spring 84 stretched between the ejecting plate 74 and the side wall 16, and thus the cassette 14 in the cassette holder 66 is ejected by the ejecting plate 74.

According to the cassette tape recorder 10 of the above-mentioned construction, the base 12 is in the shape of a rectangle with its transverse length substantially equal to the longitudinal length of the cassette 14, that is, set to the minimum possible length. As for the flywheel 22, it is of the largest possible size to be covered by the base 12. The space above the flywheel 22 is filled up with the supporting means 28, the reel shafts 48 and 50, the reel shaft driving means 64, part of the solenoid device 36, part of the motor 42, and the cassette holder 66, thus enjoying high efficiency of utilization. Further, the magnetic heads 24 and 25 are isolated from the rocking pin 27 serving as the rocking center of the head lever 30, and likewise the pinch roller 26 is isolated from the pin 34 serving as the rocking center of the pinch roller lever 32. Accordingly, the magnetic heads 24 and 25 and the pinch roller 26 can be fully separated from the magnetic tape and the capstan 20, respectively, if the head lever 30 and the pinch roller lever 32 rock only slightly. As for the plunger 38, it moves along the longitudinal direction of the base 12, that is, along the direction perpendicular to the extending direction of the head lever 30 and the pinch roller lever 32. Therefore, the plunger 38 can fully rock the head lever 30 and the pinch roller lever 32 by moving only a short distance. Thus, the movement of the plunger 38 and the rocking motion of the head lever 30 and the pinch roller lever 32 require only a narrow space. Moreover, the shifting device 72 is attached to the side wall 16 along the longitudinal direction of the base 12, hardly projecting outward from the side wall 16. Therefore, the shifting device 72 adds to the width of the tape recorder 10 by only a small margin.

Thus, according to the cassette tape recorder 10, the components are arranged efficiently without leaving any substantial idle space, and the flywheel is maximized in size. Accordingly, the tape recorder 10 can be further miniaturized, and can enjoy stabilized capstan drive.

Although an auto-reverse-type cassette tape recorder has been described in connection with the above-mentioned embodiment, it is to be understood that this invention is not limited to such embodiment, and may also be applied to any other suitable cassette tape recorder. In FIG. 2, the positions of the motor and the solenoid device may be exchanged with each other. Further, the cassette holder is not limited to the slot-in type, and may be of a so-called kangaroo-pocket type. Furthermore, the supporting means may be so arranged that the head lever and the pinch roller lever form an integral body.

What we claim is:

1. In an auto-reverse type cassette tape recorder comprising a base, a pair of side walls attached to the base, a capstan rotatably mounted on the base, a flywheel coaxially attached to the capstan to rotate together therewith, supporting means for bearing a magnetic head and a pinch roller and arranged on the base to be movable between an operating position and a non-operating position, a generally rectangular prism shaped cassette holder for containing a correspondingly shaped cassette therein and movable between a first position to allow the cassette to be inserted thereinto and removed therefrom and a second position for playback operation, a solenoid device having a plunger coupled with the supporting means for controlling the movement of the supporting means, a motor for driving the capstan and the flywheel to rotate, and a shifting device for controlling the movement of the cassette holder, the improvement in which:

said base is in the shape of a rectangle having a transverse length substantially equal to the longitudinal length of the cassette to be contained in the cassette holder;

said pair of side walls are attached to opposite side edges of the base, extending along the longitudinal direction of the base to face each other;

said capstan is located substantially in the transverse center of the base;

said flywheel has a diameter substantially equal to the transverse length of the base;

said supporting means is elongate and is pivotally arranged on the base along the transverse direction thereof, near the capstan and above the flywheel, said magnetic heads being located at both sides of the capstan;

said cassette holder is located between said pair of side walls, on the capstan side of the supporting means and near the capstan, wherein a substantial portion of the area of said cassette holder is located above the flywheel;

said solenoid device is mounted on the base on the opposite side of the supporting means to the capstan and near the supporting means, so that the plunger may move along the longitudinal direction of the base;

said motor is arranged on the base, side by side with the solenoid device along the transverse direction of the base, part of the solenoid device and part of the motor being located above the flywheel; and said shifting device is attached to one of the side walls along the longitudinal direction of the base.

2. The cassette tape recorder according to claim 1, wherein said supporting means includes a head lever in the form of an elongate bar bearing the magnetic head and rockably attached to the base, and a pinch roller lever in the form of an elongate bar bearing the pinch roller and rockably attached to the base to rock together with the head lever.

3. The cassette tape recorder according to claim 2, wherein said magnetic heads are attached to the head lever each at a distance from the rocking center of the head lever, and the pinch roller is attached to the pinch roller lever at a distance from the rocking center of the pinch roller lever.

4. The cassette tape recorder according to claim 2, wherein said plunger is coupled with the head lever.

5. The cassette tape recorder according to claim 1, which further comprises a pair of reel shafts rotatably attached to the base along the transverse direction of the base on the capstan side of the supporting means, and reel shaft driving means adjacent to the reel shafts for driving the reel shafts to rotate, the reel shafts and the reel shaft driving means being located above the flywheel.

6. The cassette tape recorder according to claim 1, wherein said cassette holder is substantially in the form of a rectangular prism having a longitudinal length substantially equal to the transverse length of the base, and the longitudinal and transverse directions of the cassette holder correspond to the transverse and longitudinal directions of the base.

* * * * *